United States Patent
Kamiya

(10) Patent No.: US 7,886,322 B2
(45) Date of Patent: Feb. 8, 2011

(54) ELECTRONIC PROGRAM GUIDE DISPLAY CONTROL APPARATUS, ELECTRONIC PROGRAM GUIDE DISPLAY CONTROL METHOD, AND ELECTRONIC PROGRAM GUIDE DISPLAY CONTROL PROGRAM

(75) Inventor: Masahiro Kamiya, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 1274 days.

(21) Appl. No.: 10/690,525

(22) Filed: Oct. 23, 2003

(65) Prior Publication Data

US 2004/0088727 A1 May 6, 2004

(30) Foreign Application Priority Data

Oct. 31, 2002 (JP) ............................. 2002-318029

(51) Int. Cl.
*G06F 3/00* (2006.01)
*G06F 3/041* (2006.01)

(52) U.S. Cl. ............................. 725/52; 725/39; 345/173

(58) Field of Classification Search ................. 725/39, 725/52; 345/173
See application file for complete search history.

(56) References Cited

U.S. PATENT DOCUMENTS

| | | | | |
|---|---|---|---|---|
| 5,543,588 A | * | 8/1996 | Bisset et al. | 178/18.06 |
| 6,072,475 A | * | 6/2000 | van Ketwich | 345/173 |
| 6,278,443 B1 | * | 8/2001 | Amro et al. | 345/173 |
| 6,437,836 B1 | * | 8/2002 | Huang et al. | 348/734 |
| 7,061,648 B2 | * | 6/2006 | Nakajima et al. | 358/1.9 |
| 7,076,202 B1 | * | 7/2006 | Billmaier | 455/3.04 |
| 7,333,092 B2 | * | 2/2008 | Zadesky et al. | 345/169 |
| 2001/0040551 A1 | * | 11/2001 | Yates et al. | 345/156 |
| 2001/0042247 A1 | * | 11/2001 | Inoue | 725/1 |
| 2004/0085352 A1 | * | 5/2004 | Nagasaka et al. | 345/744 |

FOREIGN PATENT DOCUMENTS

| | | |
|---|---|---|
| JP | A 09-069037 | 3/1997 |
| JP | A 9-305305 | 11/1997 |
| JP | A 11-191869 | 7/1999 |
| JP | A 11-313291 | 11/1999 |
| JP | A 2000-059704 | 2/2000 |
| JP | A 2001-203908 | 7/2001 |
| JP | 2002175153 | * 6/2002 |
| JP | 2002176595 | * 6/2002 |
| JP | 2002182827 | * 6/2002 |

* cited by examiner

*Primary Examiner*—Kieu Oanh Bui
(74) *Attorney, Agent, or Firm*—Oliff & Berridge, PLC

(57) ABSTRACT

When a user touches any desired position on a display screen, a position detection section detects a specification position on the display screen and a data processing control section controls to scroll a display area based on a positional relationship between the specification position detected by the position detection section and a predetermined position on the display screen, namely, the direction, the distance, and the like.

13 Claims, 10 Drawing Sheets

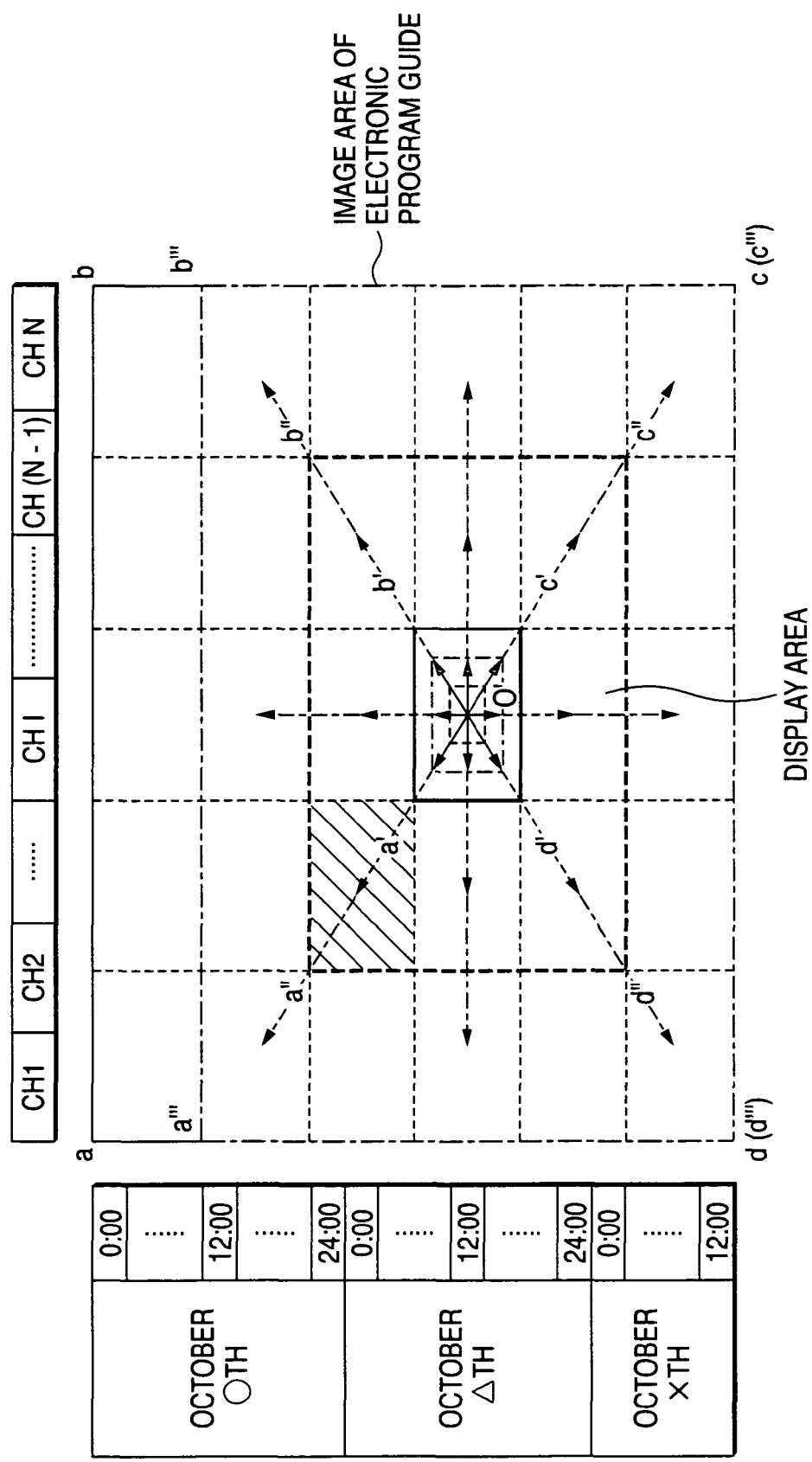

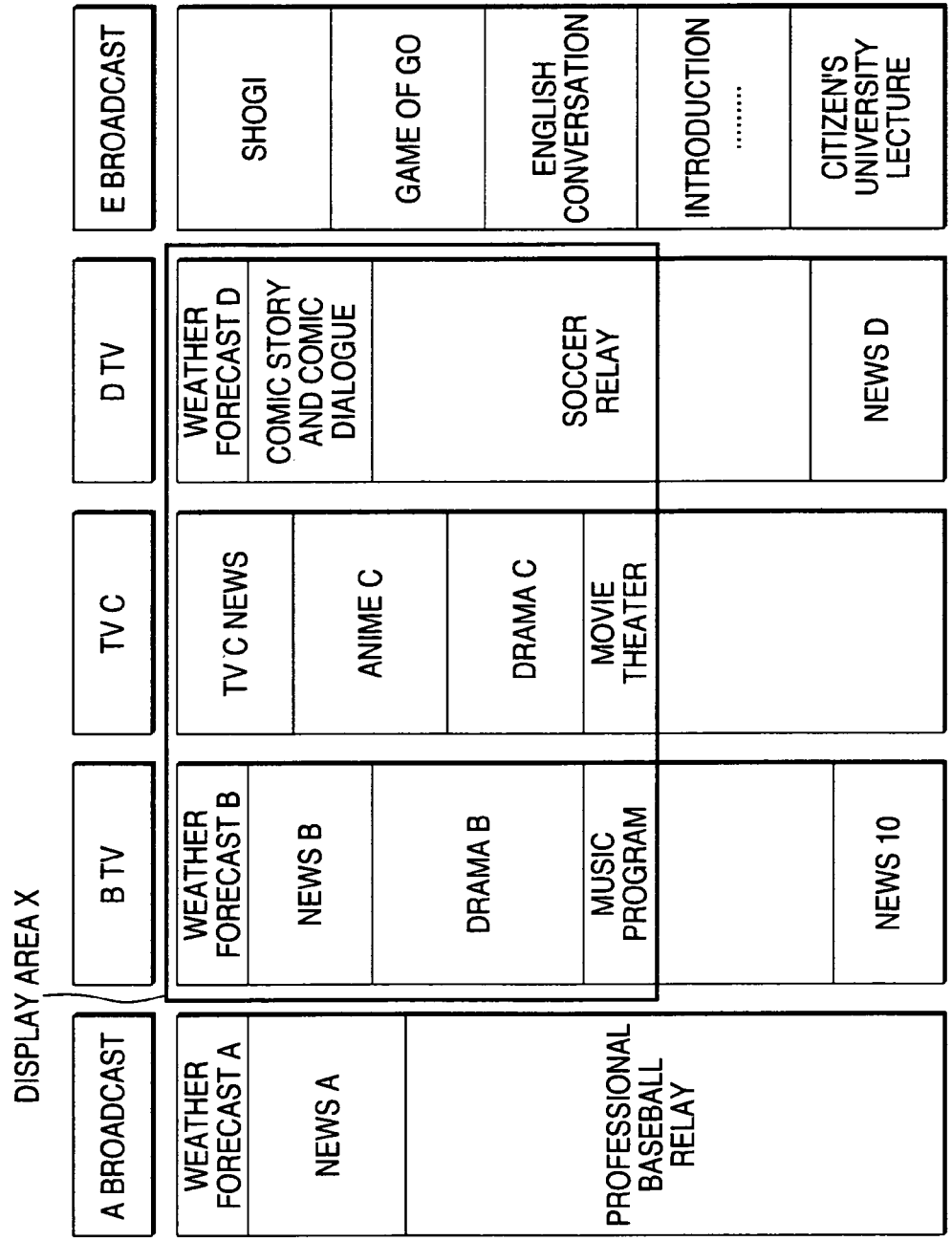

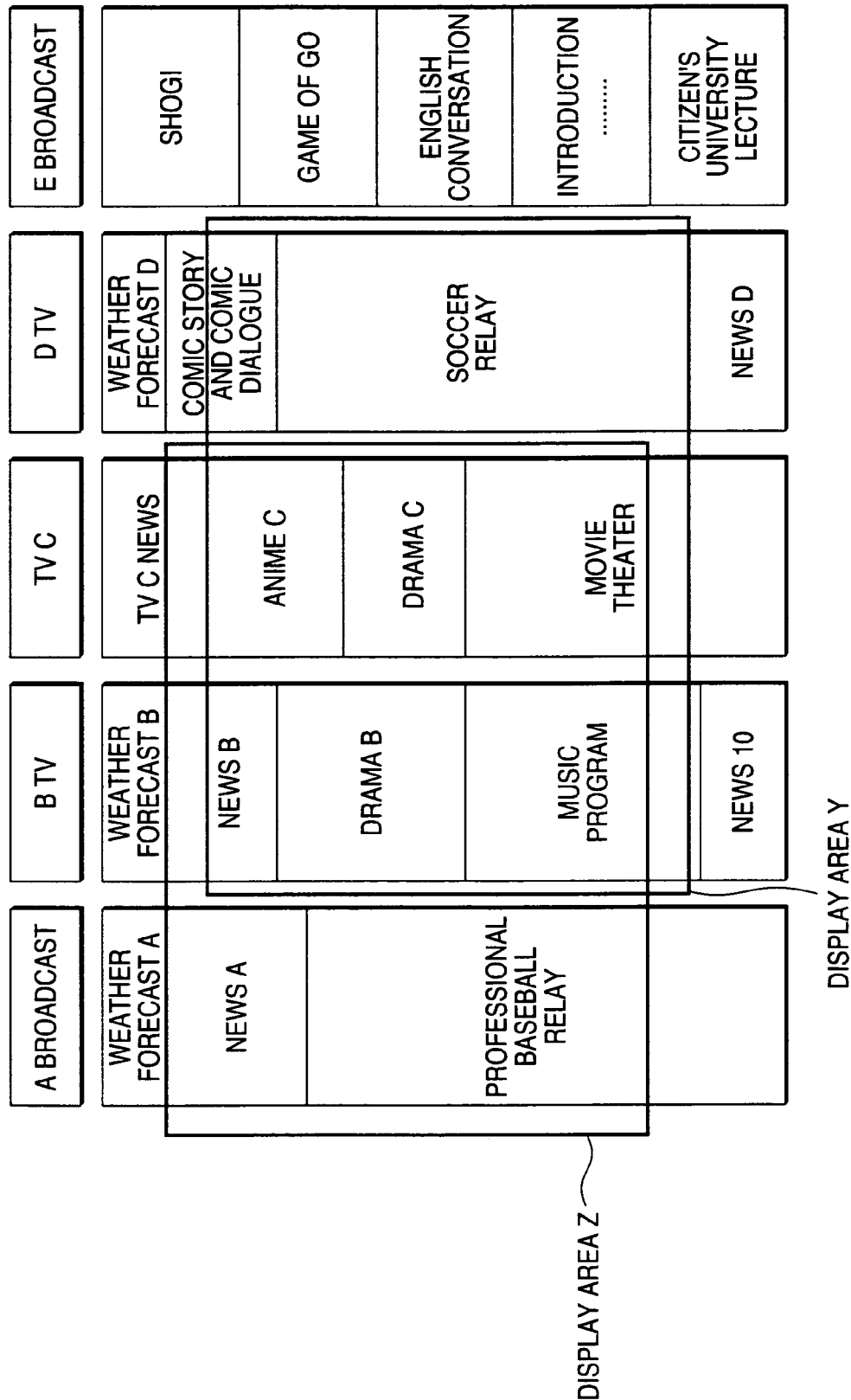

ELECTRONIC PROGRAM GUIDE DISPLAY CONTROL APPARATUS, ELECTRONIC PROGRAM GUIDE DISPLAY CONTROL METHOD, AND ELECTRONIC PROGRAM GUIDE DISPLAY CONTROL PROGRAM

The present disclosure relates to the subject matter contained in Japanese Patent Application No. 2002-318029 filed Oct. 31, 2002, which is incorporated herein by reference in its entirety.

BACKGROUND OF THE INVENTION

1. Field of the Invention

This invention relates to an electronic program guide display control apparatus, an electronic program guide display control method, and an electronic program guide display control program for displaying an electronic program guide of digital television broadcasts of multiple channels and in particular to an electronic program guide display control apparatus, an electronic program guide display control method, and an electronic program guide display control program for enabling a user to easily and promptly get any desired electronic program guide by directly operating a touch-panel display to select a program.

2. Description of the Related Art

Hitherto, a television program guide has been conveyed to an audience via printed material such as a program list of a newspaper, a television program magazine, and the like. However, since television programs have been put into multiple channels with the recent widespread use of CATV, an art of conveying such a television program guide as an electronic program guide is in the process of being used.

Particularly, it is conceivable that putting into multiple channels will be advanced because of the future progression of digitalization of terrestrial television broadcasts. Therefore, the audience will have to select any desired channel from among several hundred channels.

To select any desired electronic program guide from among a large number of channels, an electronic program guide display control apparatus for enabling the user to get any desired electronic program guide easily and promptly as much as possible becomes necessary.

For example, the following art is disclosed: A hair cursor is displayed perpendicularly to the time base direction of a screen on a display displaying the time and programs two-dimensionally and a user specifies the left or right relative to the hair cursor, whereby the program guide is scrolled in the specified direction. As the distance in the time base direction from the hair cursor increases, the time interval is narrowed for displaying a large number of programs on a limited screen. (Refer to JP-A-11-313291, page 14 and FIG. 3)

An art of remotely controlling a menu screen on a display with a touch panel of a remote control connected to the menu screen in two-way communications and displaying a program guide is also disclosed. In the art, a cursor is also displayed on the screen for a user to scroll the program guide by dragging the cursor. (Refer to JP-A-9-305305, page 6 and FIG. 1)

However, JP-A-11-313291 only teaches scrolling the program guide in the specified direction in accordance with user's specification such as left or right of the hair cursor. The user requires a great deal of operation to display any desired program portion by performing such scroll operation from multiple channels of several ten to several hundred channels. The time interval is narrowed in the time base direction so as to display a large number of programs on the limited screen. However, the narrower the interval, the harder is to read characters. Therefore, it is difficult to grasp the displayed contents of the program guide. JP-A-9-305305 only teaches moving the cursor on the display with the remote control for scrolling the program guide screen. JP-A-9-305305 is also poor in operability like JP-A-11-313291.

Thus, an important problem is how the user can select any desired program efficiently out of the electronic program guide. Particularly in an in-vehicle television, the in-vehicle display itself is small and thus the user must select any desired program out of the electronic program guide on a small touch panel screen with a small display area. Therefore, how to select a program is an important problem.

SUMMARY OF THE INVENTION

It is therefore an object of the invention to provide an electronic program guide display control apparatus, an electronic program guide display control method, and an electronic program guide display control program for enabling the user to easily and promptly get any desired electronic program guide by directly operating a touch-panel display to select a television broadcast program.

To the end, according to a first aspect of the invention, an electronic program guide display control apparatus displays a part of an electronic program guide on a display screen and scrolls the display of a display area in response to specification operation on the display screen. The electronic program guide display control apparatus includes a specification position detection unit and a scroll control unit. The specification position detection unit detects a specification position on the display screen. The scroll control unit scrolls the display of the display area based on a positional relation between the specification position detected by the specification position detection unit and a predetermined position on the display screen.

In the first aspect, the specification position on the display screen is detected and the display area is scrolled based on the positional relationship between the detected specification position and the predetermined position on the display screen. Thus, in a case of selecting a broadcast program, the user can get any desired electronic program guide easily and promptly.

According to a second aspect of the invention, in the first aspect, the specification position detection unit detects a position on the display screen pressed by a user with the user's finger as the specification position.

In the second aspect, the position on the display screen pressed by the user with his or her finger is detected as the specification position. Thus, in the case of selecting a broadcast program, the user can get any desired electronic program guide easily and promptly.

According to a third aspect of the invention, in any one of the first and second aspects, the scroll control unit scrolls the display of the display area based on the positional relationship between the specification position detected by the specification position detection unit and a center position of the display screen.

In the third aspect, the display area is scrolled based on the positional relationship between the detected specification position and the center position of the display screen. Thus, in the case of selecting a broadcast program, the user can get any desired electronic program guide more easily and promptly.

According to a fourth aspect of the invention, in the third aspect, the scroll control unit scrolls the display of the display area based on of a direction from the center position to the specification position and at least one of a distance from the center position to the specification position and specification pressure at the specification position.

In the fourth aspect, the display area is scrolled based on the direction from the center position to the specification position and the one of the distance from the center position to the specification position and the specification pressure at the specification position. Thus, in the case of selecting a broadcast program, the user can get any desired electronic program guide easily and promptly.

According to a fifth aspect of the invention, in the fourth aspect, if the specification position detected by the specification position detection unit is an end portion of the display screen, the scroll control unit displays content of an end portion of the electronic program guide positioned in a direction from the center position to the specification position on the display screen.

In the fifth aspect, if the detected specification position is an end portion of the display screen, the content of the end portion of the electronic program guide positioned in the direction from the center position to the specification position is displayed on the display screen. Thus, in the case of selecting a broadcast program, the user can get any desired electronic program guide easily and promptly.

According to a sixth aspect of the invention, in any of the first to fifth aspects, the electronic program guide display control apparatus further includes a program-unit regulation unit for regulating a move distance of the scrolling by the scroll control unit in program units.

In the sixth aspect, the move distance of scrolling is regulated in program units. Thus, when the user selects a broadcast program, the contents of the program guide to be displayed in the display screen can be displayed without being broken. As a result, the user can get any desired electronic program guide easily and promptly.

According to a seventh aspect of the invention, in any of the first to fifth aspects, the electronic program guide display control apparatus further includes a time-unit regulation unit for regulating a move distance of the scrolling by the scroll control unit in predetermined time units.

In the seventh aspect, the move distance of scrolling is regulated in predetermined time units. Thus, when the user selects a broadcast program, the contents of the program guide to be displayed in the display screen can be displayed without being broken. As a result, the user can get any desired electronic program guide easily and promptly.

According to an eighth aspect of the invention, in any of the first to seventh aspects, the electronic program guide display control apparatus further includes a broadcast-service-unit regulation unit for regulating a move distance of the scrolling by the scroll control unit in broadcast service units.

In the eighth aspect, the move distance of scrolling is regulated in broadcast service units. Thus, when the user selects a broadcast program, the contents of the program guide to be displayed in the display screen can be displayed without being broken. As a result, the user can get any desired electronic program guide easily and promptly.

According to a ninth aspect of the invention, an electronic program guide display control method includes displaying a part of an electronic program guide on a display screen, detecting a specification position on the display screen, and scrolling a display area of the electronic program guide based on a positional relationship between the specification position detected and a predetermined position on the display screen.

In the ninth aspect, the specification position on the display screen is detected and the display area is scrolled based on the positional relationship between the detected specification position and the predetermined position on the display screen. Thus, in the case of selecting a broadcast program, the user can get any desired electronic program guide easily and promptly.

According to a tenth aspect of the invention, an electronic program guide display control program causes a computer to perform a process including displaying a part of an electronic program guide on a display screen, detecting a specification position on the display screen, and scrolling a display area of the electronic program guide based on a positional relationship between the specification position detected and a predetermined position on the display screen.

In the tenth aspect, the specification position on the display screen is detected and the display of the display area is scrolled based on the positional relationship between the detected specification position and the predetermined position on the display screen. Thus, the user can get any desired electronic program guide more easily and promptly.

BRIEF DESCRIPTION OF THE DRAWINGS

In the accompanying drawings:

FIG. 1A is a conceptual drawing to describe movement of a display area of a touch panel display in an image area of an electronic program guide.

FIGS. 6A and 6B are drawings to show another example of scrolling the electronic program guide image shown in FIG. 1.

DETAILED DESCRIPTION OF THE PREFERRED EMBODIMENTS

Referring now to the accompanying drawings, there is shown an electronic program guide display control apparatus, an electronic program guide display control method, and an electronic program guide display control program according to embodiments of the invention. In the embodiment, the invention is applied to an electronic program guide reception system of digital television broadcasts of multiple channels.

To begin with, it will be described conceptually how a display area of a touch panel display is moved in an image area of an electronic program guide according to the embodiment. FIG. 1 is a conceptual drawing to describe movement of the display area of the touch panel display in the image area of the electronic program guide.

Figure 1B:
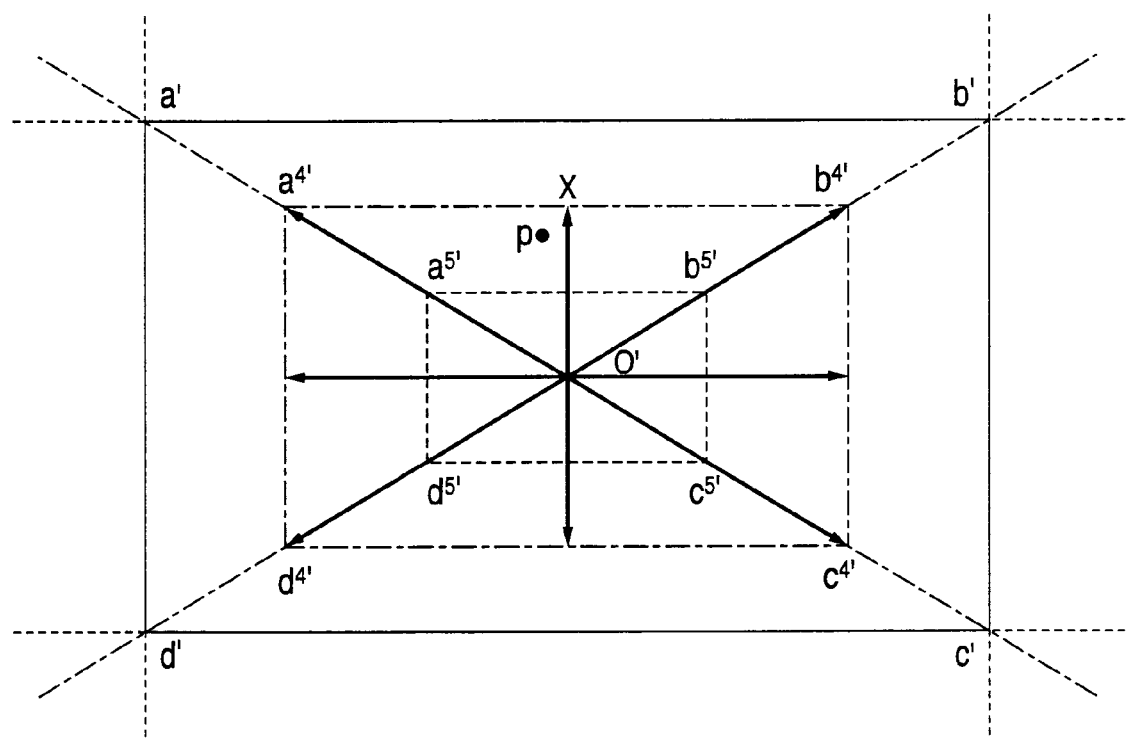
FIG. 1B is an enlarged view of a part of FIG. 1A.

As shown in FIG. 1A, a full image area (abcd) of the electronic program guide is divided in unit of size of display area (a'b'c'd'). The image area is divided in channel units and time units as much as possible so that the program description is not broken. This topic will be discussed later in more detail. Further, the divisions are grouped into image area (a"b"c"d"), (a'''b'''c'''d'''), and the like, surrounding the display area (a'b'c'd') an image of which is displayed at present radially with the display area (a'b'c'd') as the center. The display area (a'b'c'd') is also divided radially with display area center point O' as the center as indicated by a dashed line and alternate long and short dash line so as to correspond to the grouping. FIG. 1B shows an enlarged view of the display area (a'b'c'd'). The divisions ($a^{4'}b^{4'}c^{4'}d^{4'}$) and ($a^{5'}b^{5'}c^{5'}d^{5'}$) are associated with the image areas (a"b"c"d"), (a'"b'"c'"d'"), and the like.

As shown in the figure, movement directions of the display area are eight directions of up and down, side to side, and slanting directions of the display area. Although directions other than the eight directions can be finely defined on a principle, it is considered that the eight directions are sufficient in practical use if the user specifies the display area with his or her finger.

Therefore, if the user specifies one point in any arrow direction indicated by solid lines in ($a^{5'}b^{5'}c^{5'}d^{5'}$) of the display area, the user can designate one divided image area of (a",b",c",d") positioned on an extension of the arrow direction indicated by the solid line in a one-to-one correspondence. For example, if the user specifies a point on or near a line between O' and $a^{5'}$, the user can designate a shaded image area in FIG. 1A. If the user specifies one point in any arrow direction indicated by the solid line in ($a^{4'}b^{4'}c^{4'}d^{4'}$) of the display area except for ($a^{5'}b^{5'}c^{5'}d^{5'}$), the user can designate one divided image area of (a'",b'",c'",d'"), which is positioned on an extension of the arrow direction indicated by the solid line and outside of the image area (a",b",c",d"), in a one-to-one correspondence. In this case, there is an image area to which move cannot be made by one operation; however, as the above-described operation is repeated twice, move can be made to such image area. Thus, the user specifies the distance and the direction from the center of the display area with his or her finger, etc., whereby the user can designate and scroll the full image area of the electronic program guide by performing operation a small number of times. Thus, in case of selecting a broadcast program, the user can get any desired electronic program guide easily and promptly. It may also be possible to control the move distance by the press pressure of a finger, etc. To do this, a transparent sheet switch of a two-layer structure of the type wherein if the press force is weak, the upper-layer switch is brought into conduction and if the press force is strong, the lower-layer switch is also brought into conduction, a capacitive sheet switch of a two-layer structure of the type wherein the sheet-to-sheet distance changes by the press force and the electric capacitance between electrodes of upper and lower layers changes, or the like can be used.

Figure 2:
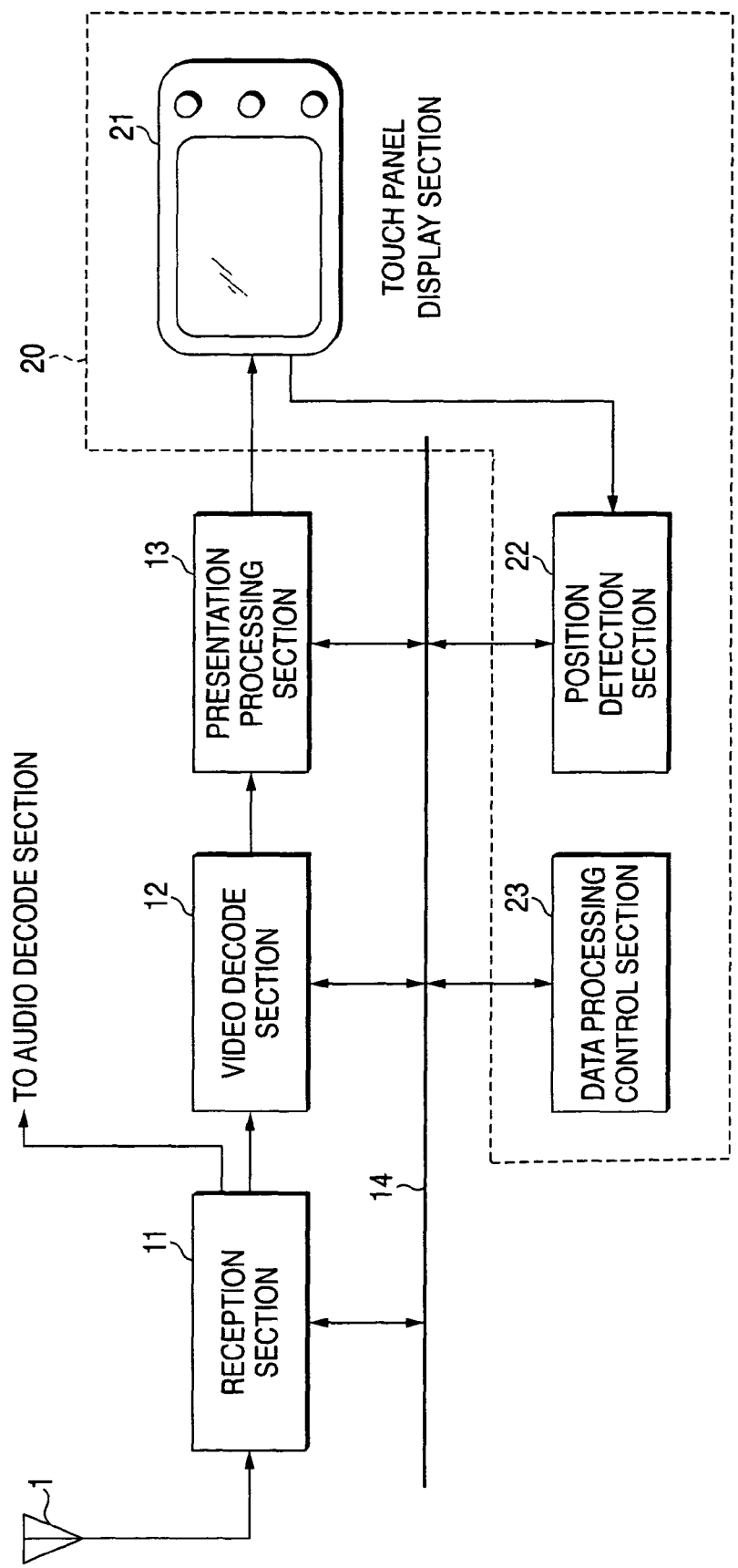
FIG. 2 is a drawing to describe the configuration of an electronic program guide reception system according to an embodiment of the invention.

Next, the configuration of an electronic program guide reception system according to the embodiment will be discussed. FIG. 2 is a drawing to describe the configuration of the electronic program guide reception system according to the embodiment. As shown in the figure, the electronic program guide reception system assumes a wireless system for receiving broadcast waves transmitted from a ground station or a satellite at an antenna, but can also be applied to a wire system of CATV and the like.

An electronic program guide display control apparatus 20 is an electronic program guide display control apparatus for displaying an image of an electronic program guide separated from the reception waves of a digital television broadcast in a display area on a display and scrolling the display area in response to an operation of the user. The electronic program guide display control apparatus 20 includes a touch panel display section 21, a position detection section 22, and a data processing control section 23. A presentation processing section 13 presents usual video and electronic program guide data using the touch panel display section 21 and thus has a closely related interface, but is not included as a component of the electronic program guide display control apparatus 20.

A broadcast wave received from a ground station or a satellite through an antenna 1 is input to a reception section 11. The broadcast wave contains compressed video data and audio data, for example, and further electronic program guide information is transmitted in the form of a table called EIT (event information table) independently of the video and audio.

For example, the electronic program guide information contains information concerning the programs on broadcast channels from the current time to 24 or 150 hours later, namely, the program names, start and end times, program description summary, cast names, etc.

The reception section 11 demodulates the broadcast wave into video data, audio data, and electronic program guide data and outputs the video data to a video decode section 12 and the audio data through an audio decode section (not shown) to a loudspeaker. The electronic program guide data is stored in a memory of the data processing control section 23.

The presentation processing section 13 contains video RAM (VRAM) and outputs a video signal to the touch panel display section 21 based on data written into the VRAM. The video data provided by the video decode section 12 or the image data of the electronic program guide generated by the data processing control section 23 is written into the VRAM.

The touch panel display section 21 is a CRT or liquid crystal touch panel display and can select and display usual video or an electronic program guide image by switching the channel.

The position detection section 22 detects a position of a point on the display area of the touch panel display section 21, which the user specifies with his or her finger, etc., and transmits the position data via a bus section 14 to the data processing control section 23. The bus section 14 is a backplane bus of a VME bus, a multibus, etc.

The data processing control section 23 determines whether the user's operation is an operation of a screen button or screen scroll specification on the basis of the position data of the point on the display area of the touch panel display section 21, which the user specifies with his or her finger, etc., and outputs a command via the bus section 14 to the presentation processing section 13.

For example, if the user operates a screen reduction button with his or her finger, etc., the data processing control section 23 transmits image reduction data via the bus section 14 to the presentation processing section 13 and causes the touch panel display section 21 display an electronic program guide image thereon. If the user specifies the display area of the electronic program guide with his or her finger, etc., the data processing control section 23 transmits the image data to be displayed via the bus section 14 to the presentation processing section 13 and makes the touch panel display section 21 display the image data to be displayed thereon.

Figure 3:
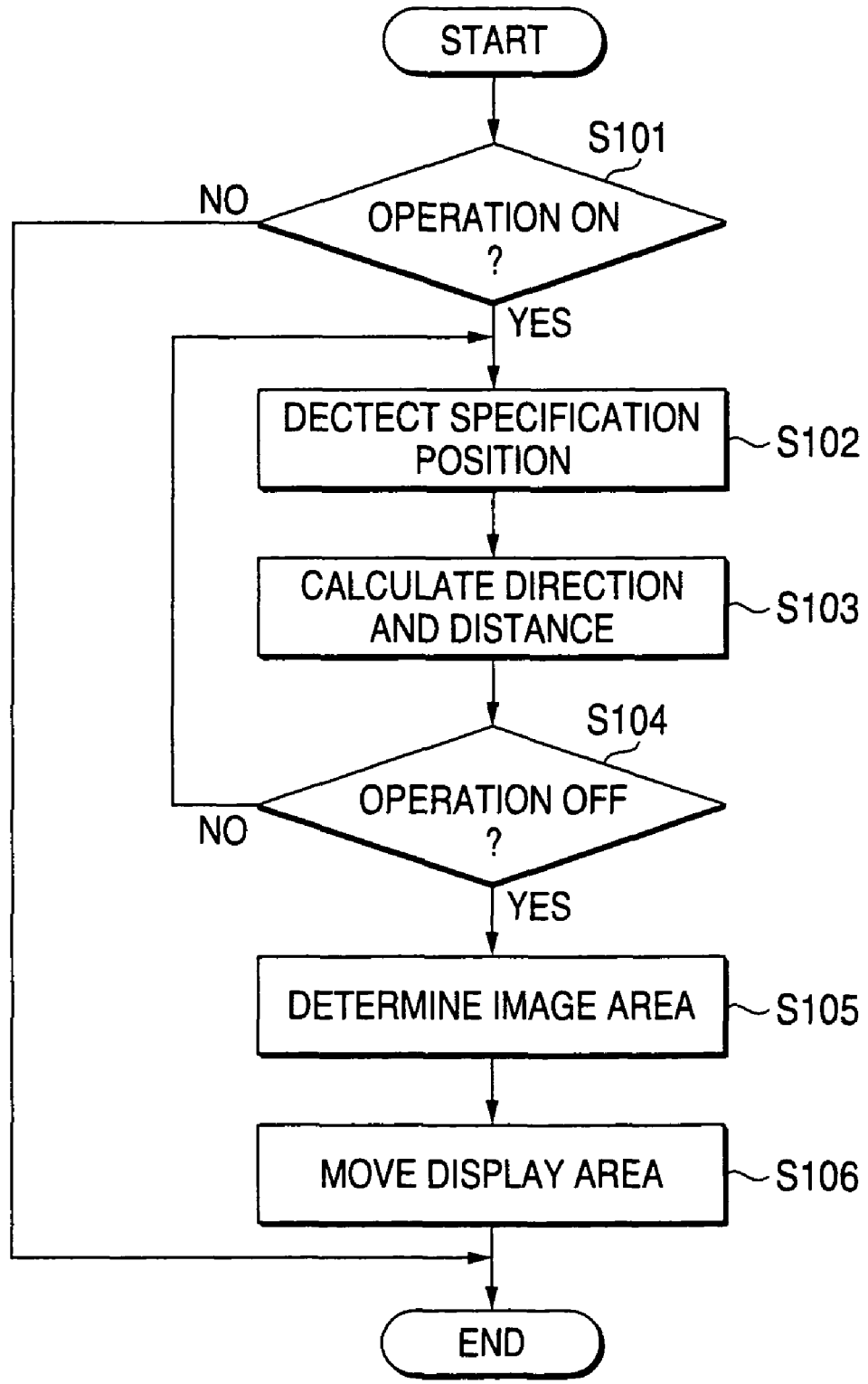
FIG. 3 is a flowchart to show a scrolling procedure of an electronic program guide image executed by the electronic program guide reception system shown in FIG. 2.

Next, a scrolling procedure of an electronic program guide image executed by the electronic program guide reception system according to the embodiment will be discussed. FIG. 3 is a flowchart to show the scrolling procedure of an electronic program guide image executed by the electronic program guide reception system according to the embodiment. The processing is repeated while the electronic program guide is being displayed.

If the user attempts to move an image of the electronic program guide and touches one point on the screen with his or her finger, etc., (YES at step S101), the position detection section 22 detects the touch position of the user with his or her finger, etc., (step S102). If the user does not touch the screen (NO at step S101), the procedure is terminated.

When the position detection section 22 detects a position of the point specified by the user with his or her finger, etc., (step S102), the data processing control section 23 receiving the position data finds the display area to which the received position data belongs and further calculates the direction and the distance relative to the center point of the display area (step S103).

Next, the data processing control section 23 determines whether or not the user's finger, etc., is moved off the screen of the touch panel display section 21 based on the detection result of the position detection section 22 (step S104). If the user's finger, etc., is not moved off the screen (NO at step S104), further the position detection section 22 detects the data of the point specified with the user's finger, etc. On the other hand, if the user's finger, etc., is moved off the screen (YES at step S104), the data processing control section 23 determines an image area to which move is to be made based on the data of the position of the last finger point detected by the position detection section 22 (step S105). It is made to move to any desired image of the electronic program guide (step S106). At this time, the screen before the move is made is displayed on the touch panel display section 21 until the finger is moved off the screen, and after the finger is moved off the screen, it is made to move to any desired screen.

Figure 4A:
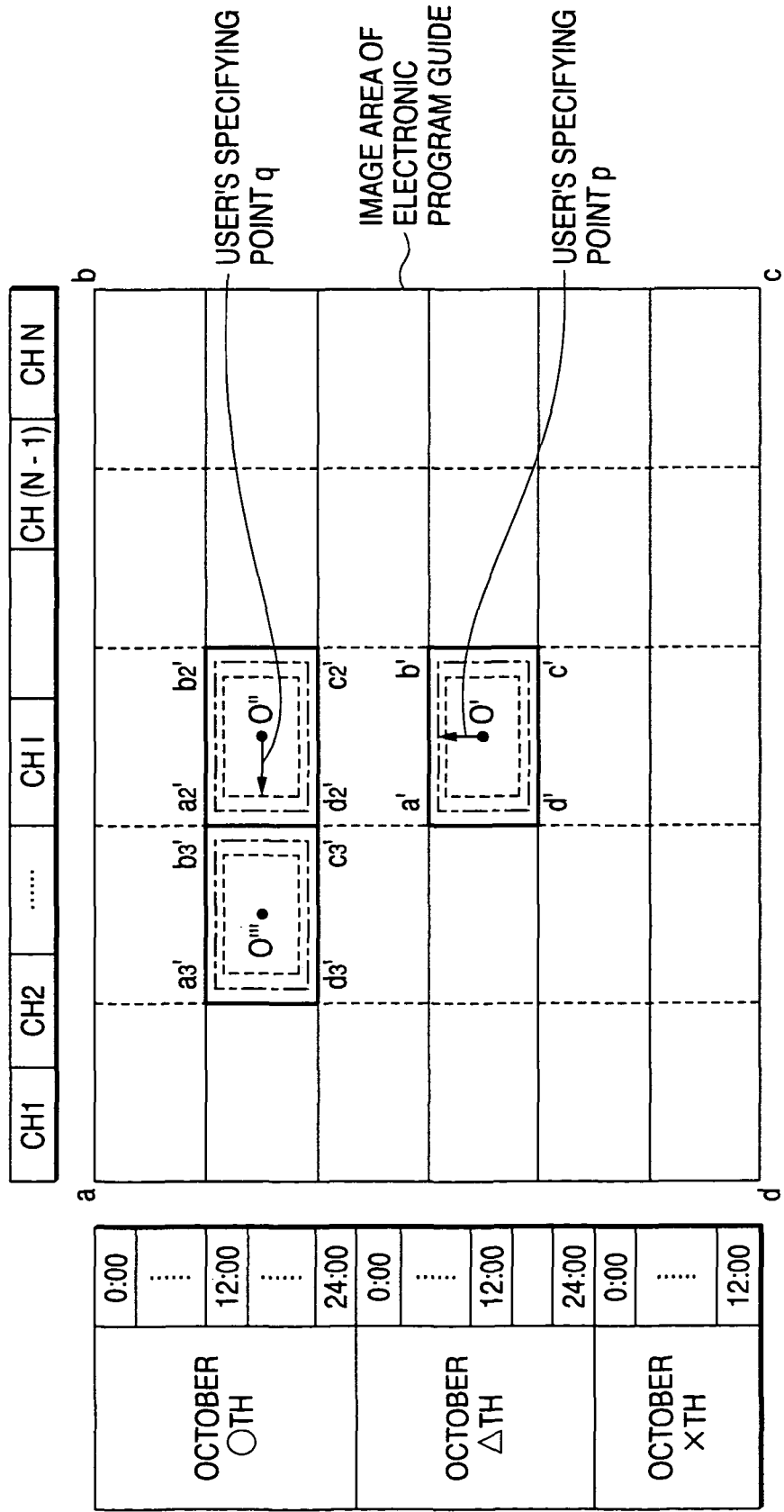
FIG. 4A is a drawing to show an example of scrolling the electronic program guide image in FIG. 1
Figure 4B:
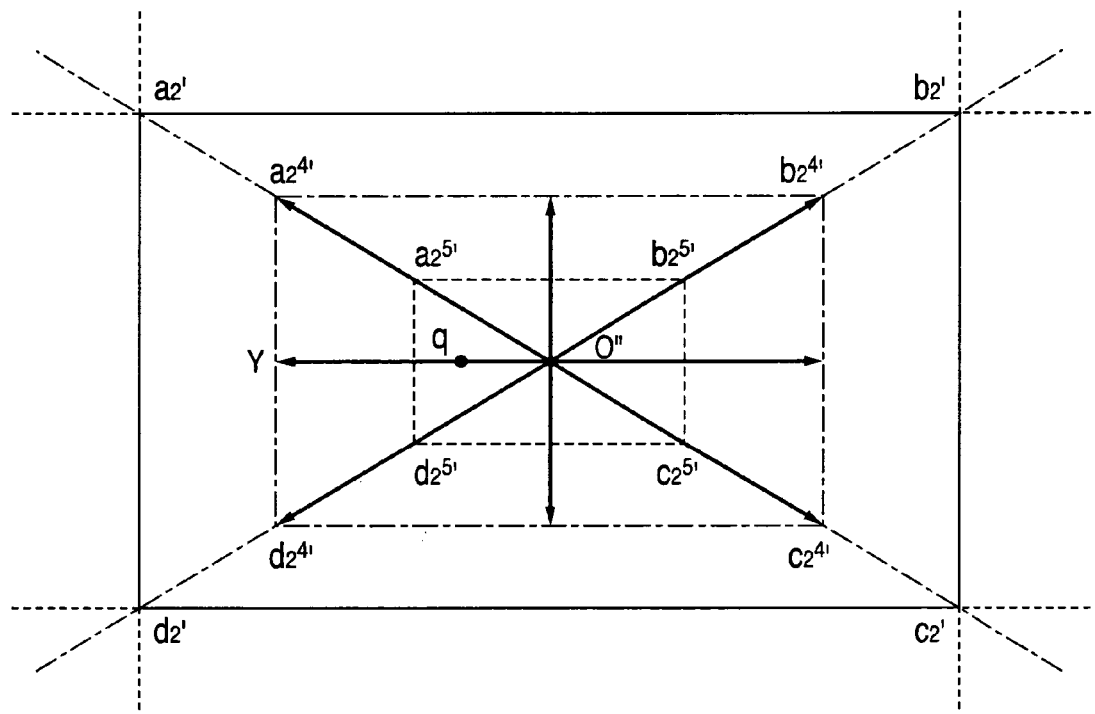
FIG. 4B is an enlarged drawing of an area $(a_2'b_2'c_2'd_2')$.

FIGS. 4A and 4B is a drawing to show an example of scrolling the electronic program guide image according to the embodiment. If the user specifies a point p in the current display area (a'b'c'd') on the screen (FIGS. 1B and 4A), the position detection section 22 detects the position of the point p. The data processing control section 23 determines based on the position data that the point p is located within the area $(a^{4'}b^{4'}c^{4'}d^{4'})$ and outside the area $(a^{5'}b^{5'}c^{5'}d^{5'})$ in the display area (a'b'c'd') and is in an arrow direction X indicated by the solid line, designates the image area $(a_2'b_2'c_2'd_2')$ based on the determination result, and moves the display area to the image area $(a_2'b_2'c_2'd_2')$.

Next, if the user specifies a point q in the display area $(a_2 b_2 c_2 d_2)$, the position detection section 22 detects a position of the point q. The data processing control section 23 determines based on the position data that the point q is within the area $(a_2^{5'}b_2^{5'}c_2^{5'}d_2^{5'})$ in the display area $(a_2'b_2'c_2'd_2')$ and is in an arrow direction Y indicated by the solid line (see FIG. 4B), designates an image area $(a_3'b_3'c_3'd_3')$, and moves the display area to the image area $(a_3'b_3'c_3'd_3')$. It cannot be made to move to the image area $(a_3'b_3'c_3'd_3')$ from the display area (a'b'c'd') by performing one operation, but it can be made to move to the image area $(a_3'b_3'c_3'd_3')$ via the image area $(a_2'b_2'c_2'd_2')$ by performing the operation twice, as previously described with reference to FIG. 1. It can be thus made to move to the entire image area of the electronic program guide as operation is performed a small number of times. Therefore, in case of selecting a broadcast program, the user can get any desired electronic program guide easily and promptly.

Figure 5:
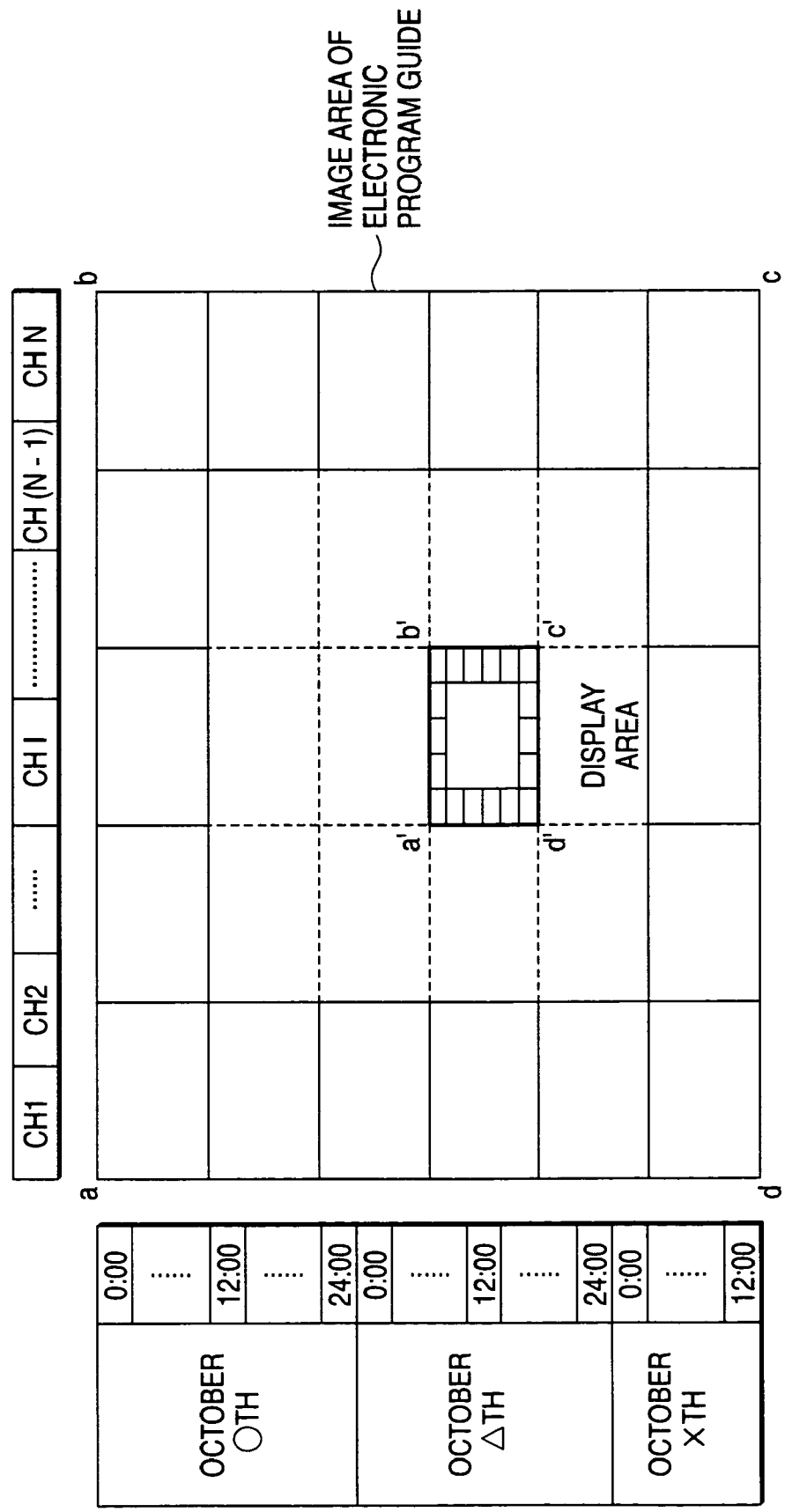
FIG. 5 is a drawing to show another example of scrolling the electronic program guide image shown in FIG. 1.

FIG. 5 is a drawing to show another example of scrolling the electronic program guide image in FIG. 2. As shown in the figure, an edge (a'b') of the display area in which an image is displayed at present is divided into as many parts as the number of parts of an edge (ab) of electronic program guide corresponding to the edge (a'b'). The parts of the edge of the display area have one-to-one correspondence with the parts of the edge of the image area in a clockwise manner from the points a' and a. This relationship is also applied to other edges. Therefore, if the user specifies the periphery of the display area with his or her finger, etc., the image area corresponding to the specification can be determined and displayed. This operation and the above-described operation are used in combination, whereby the full image area of the electronic program guide can be moved to with small number of operations. Thus, in a case of selecting a broadcast program, the user can get any desired electronic program guide easily and promptly.

In the embodiment, among the full image area (abcd) of the electronic program guide, a division area corresponding to an operation position of the user is set as a display area. However, the following display area determination method is also possible: A data acquisition area of a predetermined size is preset as a display area without dividing the full image area (abcd) of the electronic program guide and the position (or the move distance) of the data acquisition area is computed based on the operation position and a movement (a continuous move at an arbitrary distance rather than a discrete move in division units as in the embodiment) is made.

FIGS. 6A and 6B are drawings to show another example of scrolling the electronic program guide image in FIG. 2. The scrolling example is intended for preventing the display of the electronic program guide from being broken; the image is scrolled in program box units or time units.

For example, as shown in FIG. 6A, if the user displays an electronic program guide while the user is watching program "Television C news" on television C, programs in display area X with the program "Television C news" on television C being as the reference position are displayed on the screen. Here, for easy understanding, time scale in the electronic program guide is omitted; in fact, however, they are always displayed the left side portion of the display area, for example.

In this state, if the user performs operation of moving the display area of the electronic program guide downward, the display area is moved downward. In this case, the display area is moved in program units of the broadcast station, which includes the program box used as the reference (here, "Television C news"). That is, in a case of an operation of moving the display area in one-program units, area Y in FIG. 6B with "Anime C" being as the reference position (upper center) becomes a display area and display control is performed so as to prevent the program box from being incompletely displayed at the reference position (upper center), for example (so as to prevent the lower half of the program box of the program "Television C news" on television C from being displayed at the reference position, for example). For example, in a case of operation of moving in two-program units, "Drama C" becomes the reference position (upper center).

If the user performs operation of moving the display area of the electronic program guide to the left, the display area is moved to the left. In this case, the display area is moved in broadcast station units in the time (the current time if the program is at the current time) base direction of the program box used as the reference (here, "Television C news" on television C). That is, in a case of operation of moving in one-broadcast-station units, area Z in FIG. 6B with "News B" being as the reference position (upper center) becomes a display area and display control is performed so as to prevent the program column of the broadcast station at the reference position (upper center) (for example, the program column of television B) from being incompletely displayed, for example (so as to prevent the program column of television B from being displayed to one side from the center, for example). For example, in a case of operation of moving in two-broadcast-station units, "News A" becomes the reference position. In this case, in the time base direction, a move is also made to some extent in response to the program box used as the reference position so as to prevent the target program box from being incompletely displayed at the reference position.

In the embodiment, the reference position is set to the upper center of the display screen, but is not limited to the position and may be set to the center, the upper left end, etc., of the display screen so that any desired program box in the electronic program guide becomes easy to see and recognize; it is important to move in program box units or broadcast station units rather than in incomplete display area move units. In the embodiment, a move is made in program units, but most of programs often change in 30 minutes or one hour and thus a method of moving the display area in 30-minute or one-hour units is also useful. In the embodiment, for easy understanding, a move in the broadcast station units has been described. However, for digital television broadcasts, etc., one broadcast station provides a plurality of broadcast services (corresponding to conventional broadcast stations) and therefore a move may be made in broadcast service units and the broadcast stations in the description given above may be replaced with broadcast services.

Figure 7:
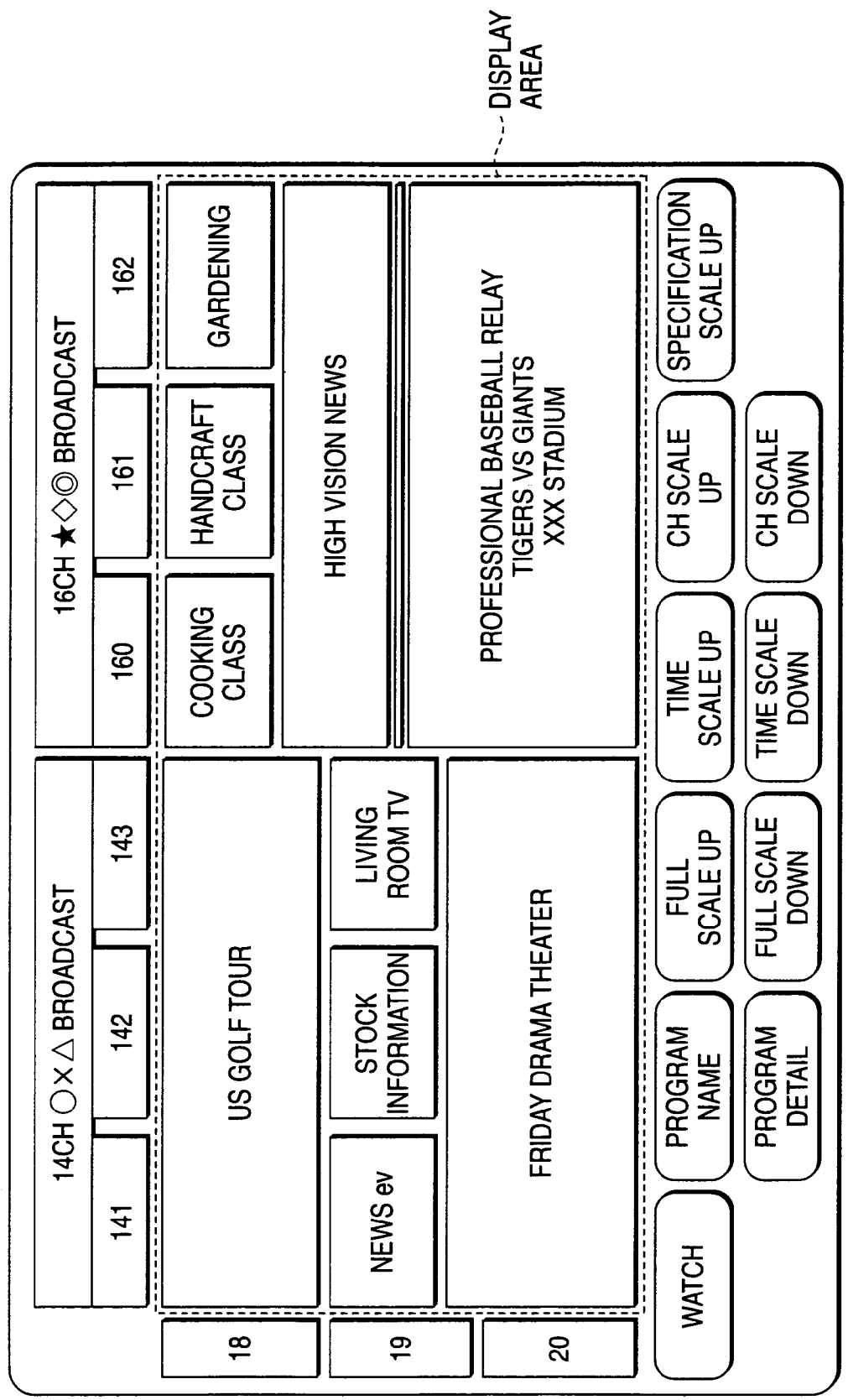
FIG. 7 shows an example of the electronic program guide image displayed on the touch panel display section shown in FIG. 2.

FIG. 7 shows an example of the electronic program guide image displayed on the touch panel display section 21. As shown in the figure, the display area of the electronic program guide is a two-dimensional array with channels and programs on the horizontal axis and time on the vertical axis. Various operation buttons for scaling up and down the image, etc., to operate the screen are displayed below the display area of the electronic program guide. For example, if the user specifies the image scaling-down button and scales down the image, the image displayed in the display area widens, so that it is useful for checking the image in the surroundings of the image area to which a move is made, etc.

As described above, in the embodiment, the electronic program guide image separated from the reception wave of a digital television broadcast is displayed on the touch panel display section 21, the user-specified point is detected by the position detection section 22, and the data processing control section 23 determines the image area to which a move is to be made based on the position data and moves the display area to the image area, so that to select a broadcast program, the user can get any desired electronic program guide easily and promptly.

In the embodiment, the center point of the display area is used as the origin of coordinates, but the invention is not limited to it. The origin can also be placed at any of the four corners of the display area or at any desired position.

As described above, according to the embodiments of the invention, the specification position on the display screen is detected and the display area is scrolled based on the positional relationship between the detected specification position and the predetermined position on the display screen. Thus, in a case of selecting a broadcast program, the user can get any desired electronic program guide easily and promptly.

According to the embodiments of the invention, the position on the display screen pressed by the user with his or her finger is detected as the specification position. Thus, in the case of selecting a broadcast program, the user can get any desired electronic program guide easily and promptly.

According to the embodiments of the invention, the display area is scrolled based on the positional relationship between the detected specification position and the center position of the display screen. Thus, in the case of selecting a broadcast program, the user can get any desired electronic program guide more easily and promptly.

According to the embodiments of the invention,

In the fourth aspect, the display area is scrolled based on the direction from the center position to the specification position and the one of the distance from the center position to the specification position and the specification pressure at the specification position. Thus, in the case of selecting a broadcast program, the user can get any desired electronic program guide easily and promptly.

According to the embodiments of the invention, if the detected specification position is an end portion of the display screen, the content of the end portion of the electronic program guide positioned in the direction from the center position to the specification position is displayed on the display screen. Thus, in the case of selecting a broadcast program, the user can get any desired electronic program guide easily and promptly.

According to the embodiments of the invention, the move distance of scrolling is regulated in program units. Thus, when the user selects a broadcast program, the contents of the program guide to be displayed in the display screen can be displayed without being broken. As a result, the user can get any desired electronic program guide easily and promptly.

According to the invention, the move distance of scrolling is regulated in predetermined time units. Thus, when the user selects a broadcast program, the contents of the program guide to be displayed in the display screen can be displayed without being broken. As a result, the user can get any desired electronic program guide easily and promptly.

According to the invention, the move distance of scrolling is regulated in broadcast service units. Thus, when the user selects a broadcast program, the contents of the program guide to be displayed in the display screen can be displayed without being broken. As a result, the user can get any desired electronic program guide easily and promptly.

What is claimed is:

1. An electronic program guide display control apparatus for displaying a part of an electronic program guide on a television display screen and scrolling the display of a display area in response to specification operation on the display screen, the electronic program guide display control apparatus comprising:

a specification point detection unit for detecting a specification point on the display screen; and a scroll control unit for scrolling the display of the display area based on a positional relation between the specification point detected by the specification point detection unit, an endpoint of a scroll and a predetermined point on the display screen, the scroll control unit changes a scroll amount based on a distance from the predetermined point to the specification point, and changes a scroll direction based on a direction of the specification point with respect to the predetermined point when the display is scrolled from a first portion of the electronic program guide to a second portion of the electronic program guide, the second portion being different from the first portion.

2. The electronic program guide display control apparatus according to claim 1, wherein the specification point detection unit detects a point on the display screen pressed by a user with the user's finger as the specification point.

3. The electronic program guide display control apparatus according to claim 2, wherein the scroll control unit scrolls the display of the display area based on the specification point detected by the specification point detection unit and a center point of the display screen as the predetermined point.

4. The electronic program guide display control apparatus according to claim 3, wherein the scroll control unit scrolls the display of the display area based on a direction from the center point to the specification point and at least one of a distance from the center point to the specification point and specification pressure at the specification point.

5. The electronic program guide display control apparatus according to claim 4, wherein if the specification point detected by the specification point detection unit is an end portion of the display screen, the scroll control unit displays content of an end portion of the electronic program guide positioned in a direction from the center point to the specification point on the display screen.

6. The electronic program guide display control apparatus according to claim 1, further comprising:
a program-unit regulation unit for regulating a move distance of the scrolling by the scroll control unit in program units.

7. The electronic program guide display control apparatus according to claim 1, further comprising:
a time-unit regulation unit for regulating a move distance of the scrolling by the scroll control unit in predetermined time units.

8. The electronic program guide display control apparatus according to claim 1, further comprising:
a broadcast-service-unit regulation unit for regulating a move distance of the scrolling by the scroll control unit in broadcast service units.

9. The electronic program guide display control apparatus according to claim 1, wherein the scroll control unit changes the scroll amount based on the distance from the predetermined point to the specification point such that the scroll amount increases based on increasing distance from the predetermined point to the specification point.

10. The electronic program guide display control apparatus according to claim 1, wherein the specification point detection unit determines whether a user's finger is moved off of the display screen, and if the user's finger is moved off the display screen, the specification point detection unit determines an image area to which a move is to be made based on the specification point last detected by the specification point detection unit.

11. An electronic program guide display control method comprising:
displaying a part of an electronic program guide on a television display screen;
detecting a specification point on the display screen; and
scrolling a display area of the electronic program guide based on a positional relationship between the specification point detected by the specification point detection unit, an endpoint of a scroll, and a predetermined point on the display screen,
changing a scroll amount based on a distance from the predetermined point to the specification point, and changes a scroll direction based on a direction of the specification point with respect to the predetermined point when the display area is scrolled from a first portion of the electronic program guide to a second portion of the electronic program guide, the second portion being different from the first portion.

12. A computer readable medium storing a program that when executed, causes a computer to execute the method as set forth in claim 11.

13. The method according to claim 11, wherein the scroll amount is changed based on the distance from the predetermined point to the specification point such that the scroll amount increases based on increasing distance from the predetermined point to the specification point.

* * * * *